United States Patent
Chapman et al.

(10) Patent No.: US 11,668,402 B2
(45) Date of Patent: Jun. 6, 2023

(54) ROTARY PLUG VALVE WITH LABYRINTH

(71) Applicant: Robert Bosch GmbH, Stuttgart (DE)

(72) Inventors: Thomas Chapman, Templeton, MA (US); George Popovici, Woburn, MA (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/490,729

(22) Filed: Sep. 30, 2021

(65) Prior Publication Data

US 2023/0100721 A1    Mar. 30, 2023

(51) Int. Cl.
*F16K 5/04* (2006.01)
*F16K 27/06* (2006.01)
*F16K 11/085* (2006.01)

(52) U.S. Cl.
CPC .......... *F16K 5/0407* (2013.01); *F16K 5/0442* (2013.01); *F16K 11/085* (2013.01); *F16K 27/065* (2013.01)

(58) Field of Classification Search
CPC .... F16K 5/0407; F16K 5/0442; F16K 5/0492; F16K 11/085; F16K 11/0853; F16K 27/065; F16K 41/16; F16K 1/2028; F16K 1/2035; F16K 1/224; F16K 1/225
See application file for complete search history.

(56) References Cited

U.S. PATENT DOCUMENTS

| | | | |
|---|---|---|---|
| 4,326,554 A | 4/1982 | Gongwer | |
| 5,571,960 A | 11/1996 | Tateishi et al. | |
| 6,286,534 B1 | 9/2001 | Bliss | |
| 11,384,852 B2 * | 7/2022 | Wang | F16K 11/0853 |
| 2015/0345373 A1 | 12/2015 | Knight | |

FOREIGN PATENT DOCUMENTS

| | | | | |
|---|---|---|---|---|
| DE | 102012106199 A1 * | 1/2014 | | F02D 9/04 |
| WO | WO-2019230796 A1 * | 12/2019 | | F16K 11/0873 |

* cited by examiner

*Primary Examiner* — Hailey K. Do
(74) *Attorney, Agent, or Firm* — Kelly McGlashen; Maginot, Moore & Beck LLP (57) ABSTRACT

A rotary valve has a valve plug that is rotatable in a valve body about a rotational axis. Surface features of the valve plug and surface features of the valve body cooperate to provide a bearing by which the valve plug is rotatably supported with respect to the valve body. In addition, each of the valve plug and the valve body include a plurality of annular projections that encircle the plain bearing and axially overlap one another so as to form a labyrinth that surrounds the bearing. The labyrinth forms a fluid path that collects abrasive particles suspended in the fluid passing through the valve, whereby wear of the valve is reduced.

19 Claims, 9 Drawing Sheets

ROTARY PLUG VALVE WITH LABYRINTH

BACKGROUND

A rotary valve is a type of directional control valve that may be used in a fluid delivery system to control fluid flow and distribution through the system. For example, rotary plug valves may be used to control the flow of coolant through a vehicle cooling system. The rotary plug valve may include a valve body that defines several ports and a valve plug disposed in the valve body. The valve plug is shaped to distribute the flow to predetermined ports for certain rotational orientations of the valve plug within the valve body. In some valves, the valve plug is rotatably supported relative to the valve body by a plain bearing. As used herein, the term "plain bearing" refers to a pin that is supported for rotation in a bore, where the sliding interface between the pin and bore provides a bearing surface that is free of rolling elements.

Fluid flowing through the valve may include abrasive media such as sand or other particles and/or debris. Such media can cause premature wear or other damage if the media infiltrates the relatively moving elements of the valve. For example, abrasive media can enter the gaps between the rotating and stationary portions of the bearing surfaces of the plain bearing. Thus, through abrasion, the bearing surfaces can experience undue wear that may limit the operating life of the valve.

SUMMARY

It is desirable to minimize or prevent the occurrence of abrasive media entering the valve rotary bearing since this media can enter the gaps between the rotating and stationary portions of the bearing surfaces, thus, through abrasion, wear the bearing surfaces and limit the operating life of the valve. To address this problem, a labyrinth may be implemented in a rotary valve to prevent abrasive media within the working fluid from reaching and damaging the valve bearing. As used herein, the term "labyrinth" refers to a structure that defines a tortuous path or a passageway having repeated bends or turns.

In particular, the labyrinth is introduced in the rotary valve to protect the bearing through which the valve plug rotates with respect to the valve body. In some embodiments, the labyrinth consists of concentric annular protrusions that protrude in a direction parallel to the axis of rotation. The annular protrusions are provided on both on the rotating and stationary components of the valve, and the annular protrusions alternate between the rotating and stationary components. The annular protrusions have predetermined axial dimensions and predetermined relative spacing, which result in a fluid path with several changes in direction, and of considerable length. This path minimizes or prevents abrasive media suspended in the fluid from reaching the lower bearing of the rotary valve, reducing wear and increasing the operating life of the valve.

In some embodiments, the labyrinth is constructed so that the radial spacing between the valve body annular protrusion and the plug annular protrusion is less than the axial spacing between the valve body annular protrusion and the valve plug and the axial spacing between the plug annular protrusion and the valve body. By this configuration, the fluid flowing through the labyrinth accelerates within the relatively narrow portions of the passageway and decelerates within the relatively wide portions of the passageway. The changes in fluid speed and direction within the labyrinth reduces fluid flow and results in the particles being trapped within relative wide portions, particularly when the wide portions are located at lowest points of the passageway. Thus, the labyrinth increases the flow resistance in a fluid path by providing several changes in direction and changes in path cross sectional area. This increased flow resistance reduces the amount of fluid flow through the path. The labyrinth also collects any suspended media that may enter the labyrinth in the lower grooves between the labyrinth rings, preventing it from reaching the valve lower bearing.

In some aspects, a rotary valve includes a valve plug that is disposed in a valve body and that is rotatable relative to the valve body about a rotational axis. Surface features of the valve plug and surface features of the valve body cooperate to provide a bearing by which the valve plug is rotatably supported with respect to the valve body. In addition, each of the valve plug and the valve body include a plurality of annular projections that encircle the plain bearing and axially overlap one another so as to form a labyrinth that surrounds the bearing.

In some embodiments, the valve plug includes a valve shaft that is aligned with the rotational axis, the valve shaft and the valve plug surface features being disposed on opposed sides of the valve plug.

In some embodiments, the surface features of the valve plug include one of a pin that is centered on the rotational axis, or a bore that is centered on the rotational axis. In addition, the surface features of the valve body include the other of the pin that is centered on the rotational axis, or the bore that is centered on the rotational axis. The pin is disposed in, and supported for rotation by, the bore so as to provide the plain bearing.

In some embodiments, the surface features of the valve plug include one of a shaft that is centered on the rotational axis, or an opening that is centered on the rotational axis. In addition, the surface features of the valve body include the other of the shaft that is centered on the rotational axis, or the opening that is centered on the rotational axis. The shaft is disposed in, and supported for rotation by, the opening so as to provide the plain bearing.

In some embodiments, the labyrinth flow path is defined between a body annular protrusion that protrudes from an inner surface of the valve body and encircles the plain bearing and a plug annular protrusion that protrudes from an outer surface of the valve plug, encircles the plain bearing, and is radially spaced apart from the body annular protrusion.

In some embodiments, the radial spacing between the body annular protrusion and the plug annular protrusion is less than an axial spacing between the body annular protrusion and the valve plug.

In some embodiments, the radial spacing between the body annular protrusion and the plug annular protrusion is less than an axial spacing between the plug annular protrusion and the valve body.

In some embodiments, the body annular protrusion includes a first body annular protrusion, and a second body annular protrusion that surrounds the first body annular protrusion. The plug annular protrusion includes a first plug annular protrusion that is disposed between, and radially spaced apart from, the first body annular protrusion and the second body annular protrusion. In addition, the plug annular protrusion includes a second plug annular protrusion that surrounds, and is radially spaced apart from, the second body annular protrusion.

In some embodiments, the radial spacing between the first body annular protrusion or the second body annular protrusion and an adjacent one of the first plug annular protrusion and the second plug annular protrusion is less than an axial spacing between the first and second body annular protrusions and the valve plug.

In some embodiments, the radial spacing between the first body annular protrusion or the second body annular protrusion and an adjacent one of the first plug annular protrusion and the second plug annular protrusion is less than an axial spacing between the first and second plug annular protrusions and the valve body.

In some aspects, a rotary valve includes a valve body, a valve plug and a labyrinth. The valve body includes a body sidewall that encircles and is centered on a body axis, a body first end that closes one end of the body sidewall, and a body second end that is opposite the body first end. The body second end is open. The valve body includes a lid that closes the body second end. The body sidewall, the body first end and the lid cooperate to define a valve body chamber. The valve body also includes valve ports, each valve port communicating with the valve body chamber. The valve plug is disposed in the valve body chamber. The valve plug is rotatable relative to the valve body about a rotational axis that coincides with the body axis. The valve plug is configured to provide a fluid path between certain ones of the valve ports for a predetermined rotational orientation of the valve plug with respect to the valve body. In addition, the labyrinth provides a labyrinth flow path between the valve plug and the lid. The lid includes a lid surface feature that includes one of a pin that is centered on the rotational axis, or a bore that is centered on the rotational axis. The lid surface feature is engaged with a plug surface feature provided on the valve plug. The plug surface feature includes the other of the pin that is centered on the rotational axis, or the bore that is centered on the rotational axis. The pin is disposed in the bore to provide a plain bearing that supports the valve plug for rotation relative to the valve body. The labyrinth encircles the plain bearing.

In some embodiments, the lid inner surface faces the valve plug, and the lid surface feature is a pin that protrudes from the inner surface so as to be centered on the rotational axis. The pin is disposed in a bore provided on the valve plug, and the pin and the bore cooperate to provide the plain bearing.

In some embodiments, the valve plug includes a passageway that provides a fluid path between certain ones of the valve ports for a predetermined rotational orientation of the valve plug with respect to the valve body.

In some embodiments, the valve plug includes a valve shaft that is coaxial with the plug surface feature, the valve shaft and the plug surface feature being disposed on opposed sides of the valve plug.

In some embodiments, the labyrinth includes a lid annular protrusion that protrudes from an inner surface of the lid and encircles the plain bearing, and a plug annular protrusion that protrudes from an outer surface of the valve plug, encircles the plain bearing, and is radially spaced apart from the lid annular protrusion. The plug annular protrusion and the lid annular protrusion are arranged to form the labyrinth flow path.

In some embodiments, the radial spacing between the lid annular protrusion and the plug annular protrusion is less than an axial spacing between the lid annular protrusion and the valve plug.

In some embodiments, the radial spacing between the lid annular protrusion and the plug annular protrusion is less than an axial spacing between the plug annular protrusion and the lid.

In some embodiments, the lid annular protrusion includes a first lid annular protrusion, and a second lid annular protrusion that surrounds the first lid annular protrusion. The plug annular protrusion includes a first plug annular protrusion that is disposed between, and radially spaced apart from, the first lid annular protrusion and the second lid annular protrusion. In addition, the plug annular protrusion includes a second plug annular protrusion that surrounds, and is radially spaced apart from, the second lid annular protrusion.

In some embodiments, the radial spacing between the first lid annular protrusion or the second lid annular protrusion and an adjacent one of the first plug annular protrusion and the second plug annular protrusion is less than an axial spacing between the first and second lid annular protrusions and the valve plug.

In some embodiments, the radial spacing between the first lid annular protrusion or the second lid annular protrusion and an adjacent one of the first plug annular protrusion and the second plug annular protrusion is less than an axial spacing between the first and second plug annular protrusions and the lid.

DETAILED DESCRIPTION

Referring to FIGS. 1-4, a fluid delivery system 1 includes a multi-port rotary plug valve 18 that is capable of controlling fluid flow driven by a pump 5 between two, three or more individual fluid lines 10, 12, 14 within the fluid delivery system 1. The rotary plug valve 18 may be used, for example, to control the distribution and flow of coolant in the cooling system 1 of an electric vehicle. In this example, the rotary plug valve 18 may control flow of coolant fluid between a radiator 2 and an electric drive device 3 in which power electronics, a vehicle axle drive motor and a transmission are provided as a single module. In some valve positions, the rotary plug valve 18 delivers coolant to a line 12 that connects the radiator 2 to the electric drive device 3, whereas in other valve positions, the rotary plug valve 18 delivers coolant to a line 14 that bypasses the radiator 2.

The rotary plug valve 18 includes a valve body 20 and a valve plug 50 that is disposed in, and rotates relative to, the valve body 20 about a rotational axis 52. The valve plug 50 includes surface features 64 that cooperate with corresponding surface features 44 of the valve body 20 to provide a plain bearing 100 by which the valve plug 50 is rotatably supported with respect to the valve body 20. In addition, each of the valve body 20 and the valve plug 50 include annular projections 46, 66 that form a labyrinth 120 that surrounds the bearing 100. The annular projections 46, 66 encircle the bearing 100 and axially overlap one another so as to form a labyrinth flow path that attenuates flow of fluid disposed in the valve body 20 to the bearing 100 and entraps abrasive media suspended in the fluid. The bearing 100 and labyrinth 120 will be described in detail below.

The valve body 20 includes multiple valve ports 33, 34, 35. The rotational orientation of the valve plug 50 relative to the valve body 20 determines one or more fluid flow paths through corresponding ones of the valve ports 33, 34, 35. The rotational orientation of the valve plug 50 relative to the valve body 20 is set via an actuator 6. The valve plug 50 has multiple openings associated with fluid passages 60, 63 that, depending on the rotational orientation of the valve plug 50 relative to the valve body 20, divert fluid to certain ones of the valve ports 33, 34, 35, whereby the distribution of coolant fluid in the coolant system 1 is controlled. In addition, the rotary plug valve 18 may include an elastomeric valve seal 110 that is biased toward an inner surface of the valve body 20 via a spring 112, and provides a fluid-tight seal between the valve body 20 and the valve plug 50. Details of the rotary plug valve 18, including the valve body 20, the valve plug 50, the bearing 100 and the labyrinth 120 will now be described in detail.

Figure 5:
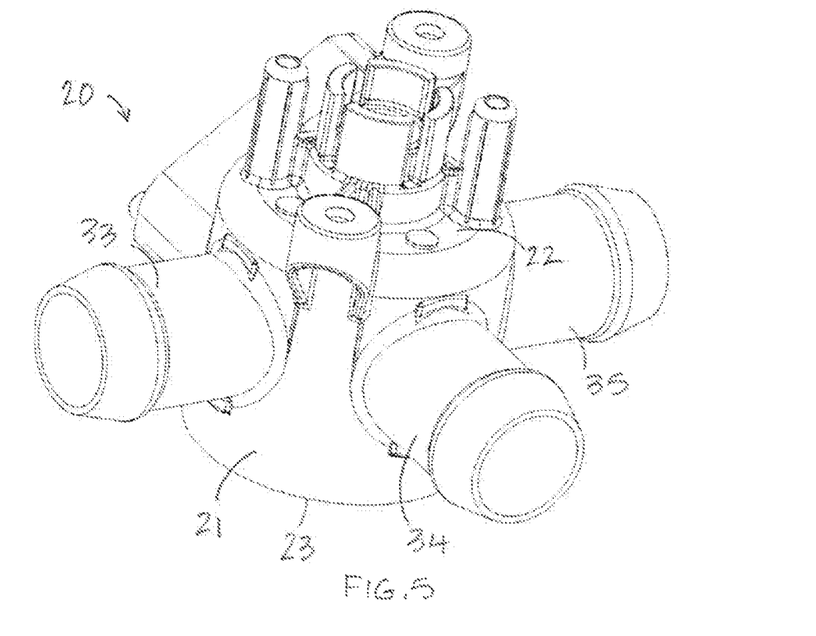
FIG. 5 is a top perspective view of the valve body of the rotary plug valve.
Figure 6:
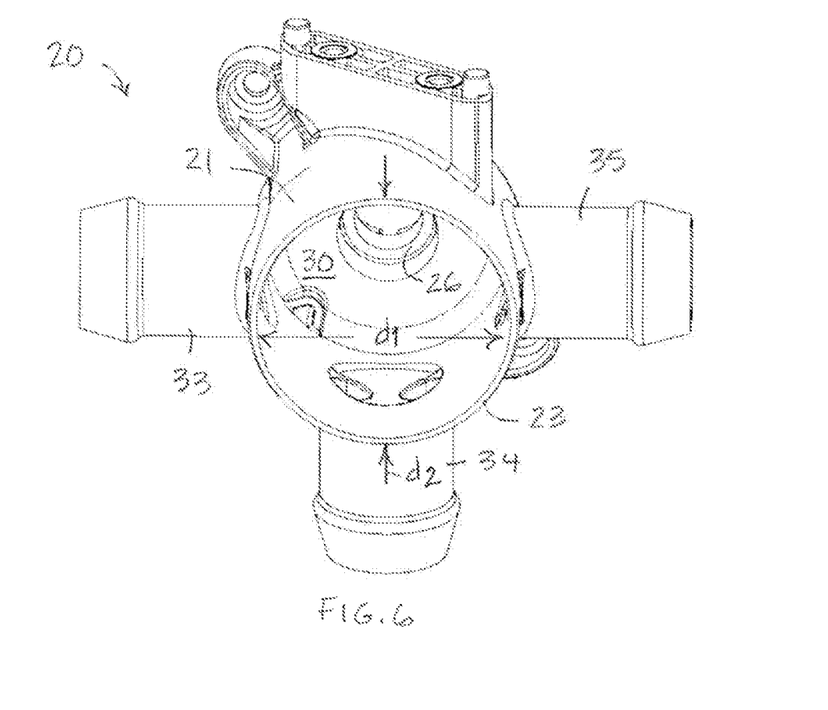
FIG. 6 is a bottom perspective view of the valve body of the rotary plug valve.

Referring to FIGS. 5 and 6, the valve body 20 includes a cylindrical sidewall 21, a closed first end 22 and an open second end 23 that is opposed to the first end 22. In the illustrated embodiment, the valve body 20 is oriented so that the first end 22 overlies the second end 23, but the valve body is not limited to this orientation. A centerline of the sidewall 21 is concentric with the rotational axis 52. The sidewall 21 and the first end 22 together form a generally cup-shaped structure that defines a valve plug chamber 30 therein. The first end 22 includes a central opening 26 that is shaped and dimensioned to receive therethrough a valve shaft 51 of the valve plug 50. A shaft seal 80 is disposed in the central opening 26 and provides a fluid tight seal between the valve shaft 51 and the central opening 26.

In the illustrated embodiment, the valve body 20 includes a first valve port 33, a second valve port 34 and a third valve port 35. Although the rotary plug valve 18 includes three valve ports 33, 34, 35, the valve body 20 is not limited to this number of ports and the number of valve ports is determined by the specific application. Each of the valve ports 33, 34, 35 protrudes outward from the sidewall 21 along a radius of the rotational axis 52, and communicates with the valve plug chamber 30. In the illustrated embodiment, the valve ports 33, 34, 35 are cylindrical tubes, and each valve port 33, 34, 35 forms a circular opening at the intersection with the valve body sidewall 21.

The valve ports 33, 34, 35, are provided at mutually spaced-apart locations about a circumference of the sidewall 21. The valve ports 33, 34, 35 are each spaced apart from the valve body first end 22 by the same distance and thus reside in a common plane. Although, as illustrated, the valve ports 33, 34, 35 each have the same length, cross-sectional shape and dimensions, the valve ports 33, 34, 35 are not limited to this configuration. Moreover, the valve ports 33, 34, 35 are not limited to the illustrated co-planar and radially oriented configuration. For example, in other embodiments, certain ones of the valve ports 33, 34, 35 may be non-co-planar with the other valve ports and/or may protrude from the closed first end 22 rather than the sidewall 21. The valve ports 33, 34, 35 may protrude in a direction that is parallel to the rotational axis 52, in a direction that is perpendicular to the rotational axis 52 (shown) or at any angle between perpendicular and parallel to the rotational axis 52. The valve ports 33, 34, 35 may protrude non-radially, and an axis of a given valve port is not required to intersect the rotational axis 52. In many applications, the configuration of the valve ports 33, 34, 35 is determined by packaging requirements.

In the illustrated embodiment, the first and third valve ports 33, 35 are disposed on opposed sides of the valve body 20, and extend in parallel along a common diameter d1 of the valve body 20. The second valve port 34 is disposed between the first and third valve ports 33, 35 and extends along a second diameter d2 of the valve body 20 that is perpendicular to the first diameter d1.

The valve body sidewall 21 has a height dimension that corresponds to the distance between the sidewall first and second ends 22, 23 in a direction parallel to the rotational axis 52. In the illustrated embodiment, the height dimension of the valve body 20 is the same as, or slightly greater than, a diameter d1, d2 of the sidewall 21.

Figure 1:
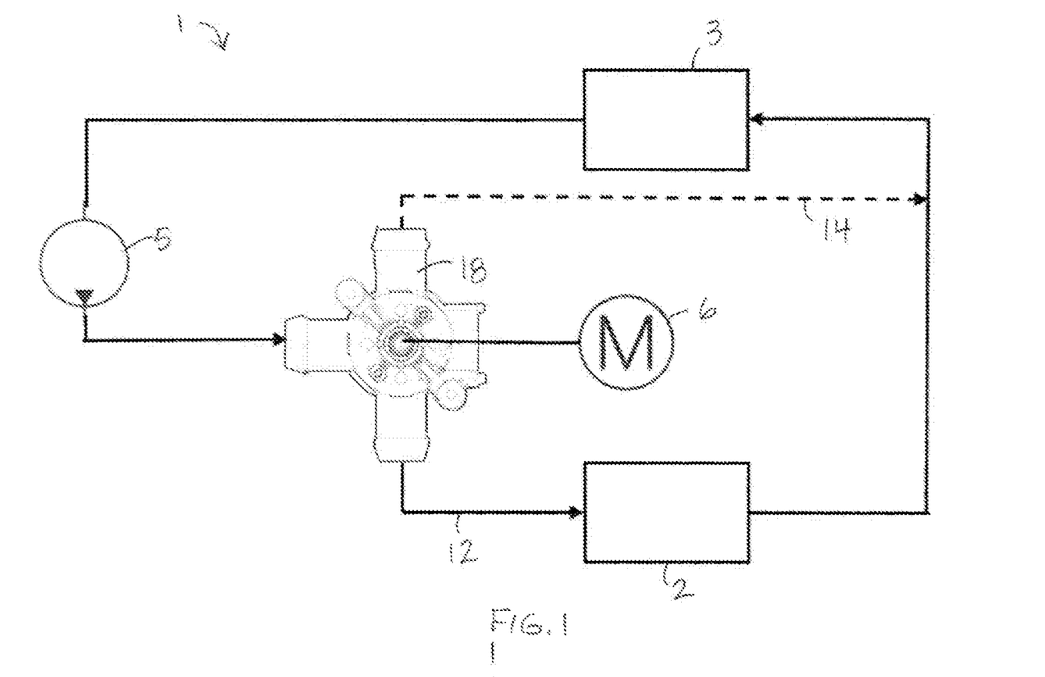
FIG. 1 is a schematic of a vehicle cooling system including a rotary plug valve.
Figure 2:
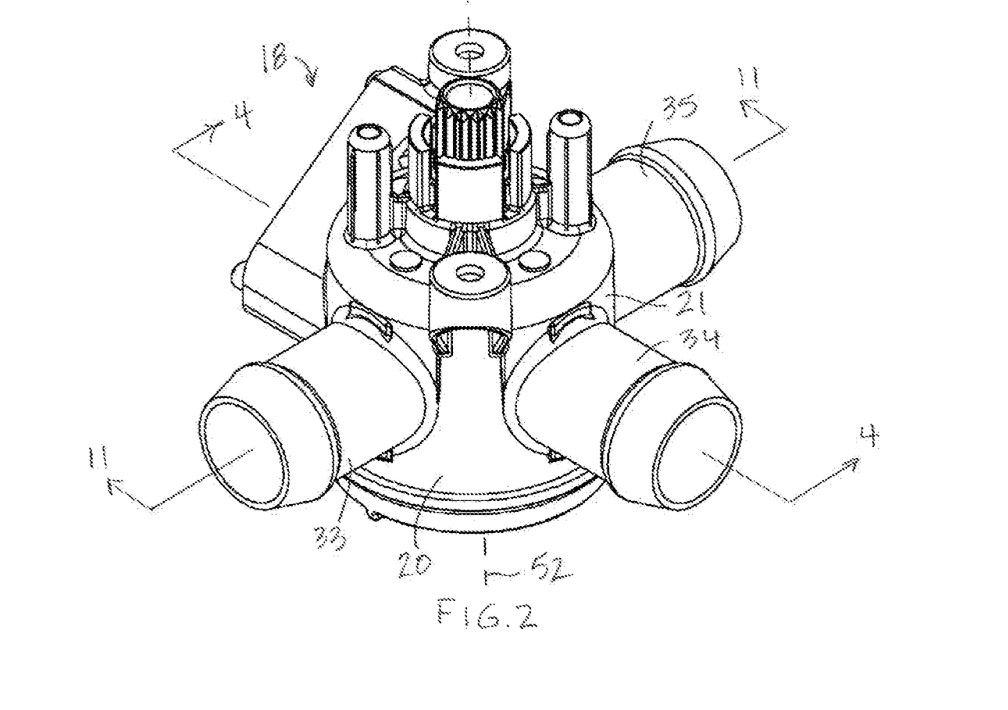
FIG. 2 is a perspective view of the rotary plug valve.
Figure 3:
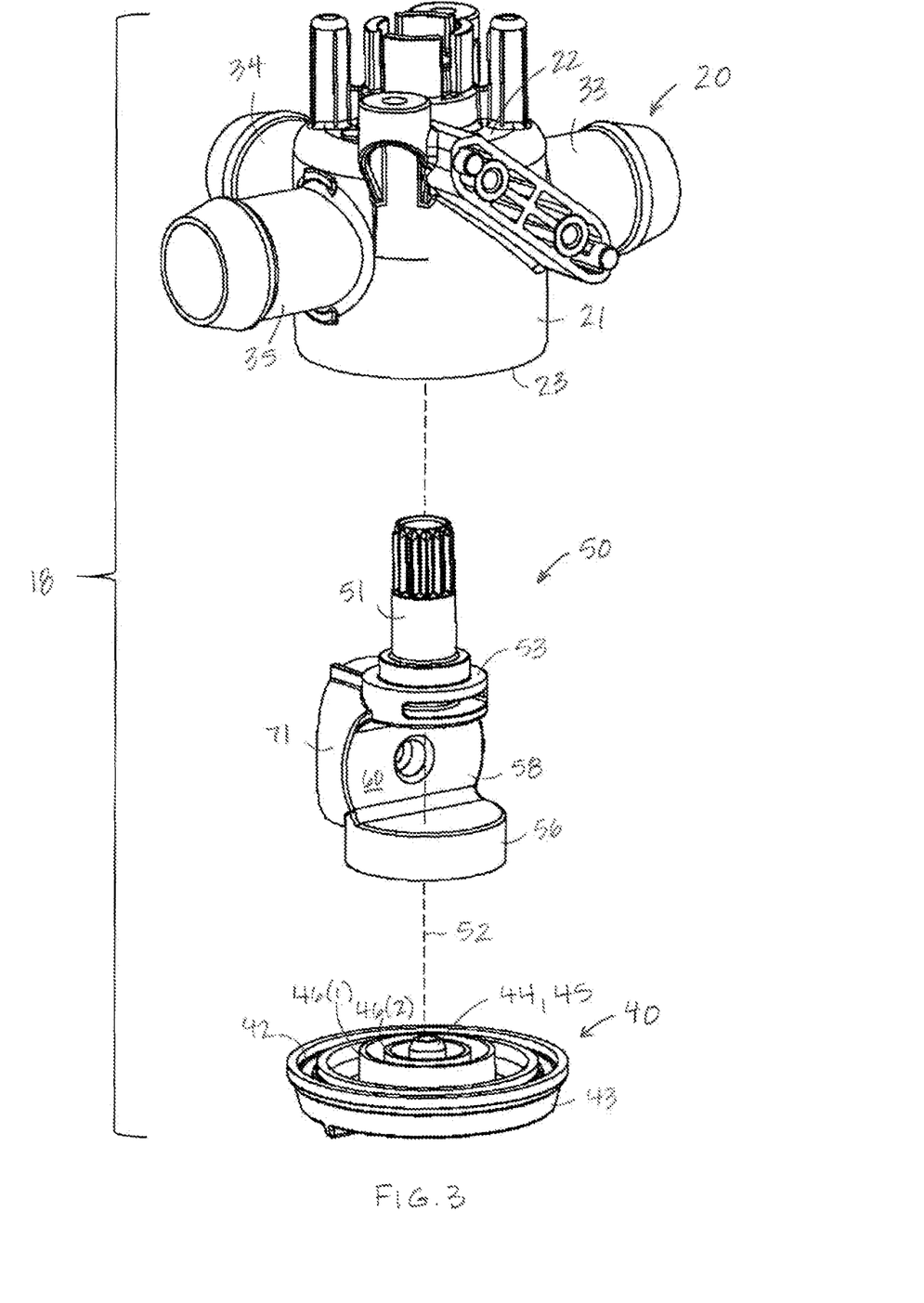
FIG. 3 is an exploded view of the rotary plug valve.
Figure 4:
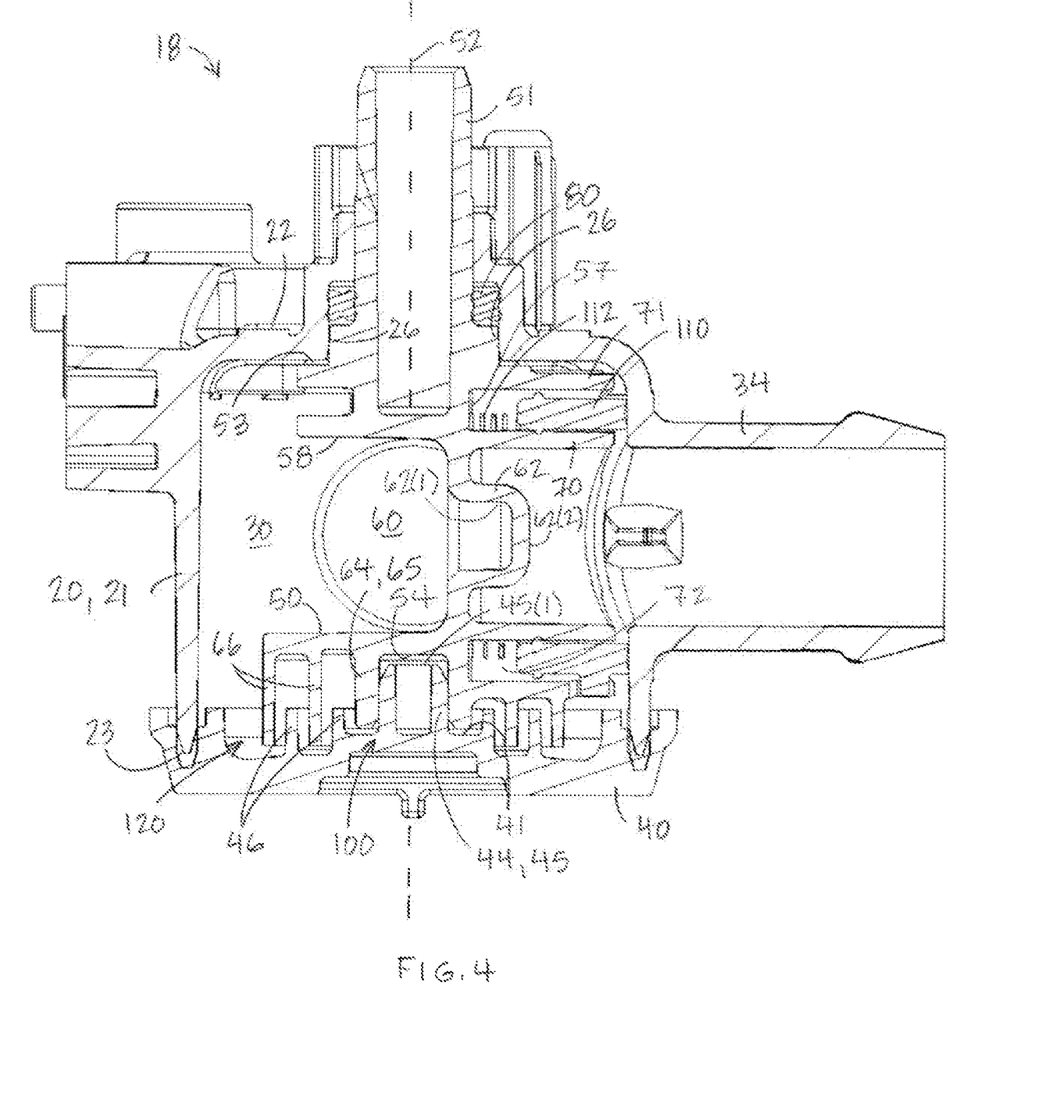
FIG. 4 is a cross-sectional view of the rotary plug valve as seen along line 4-4 of FIG. 2.
Figure 7:
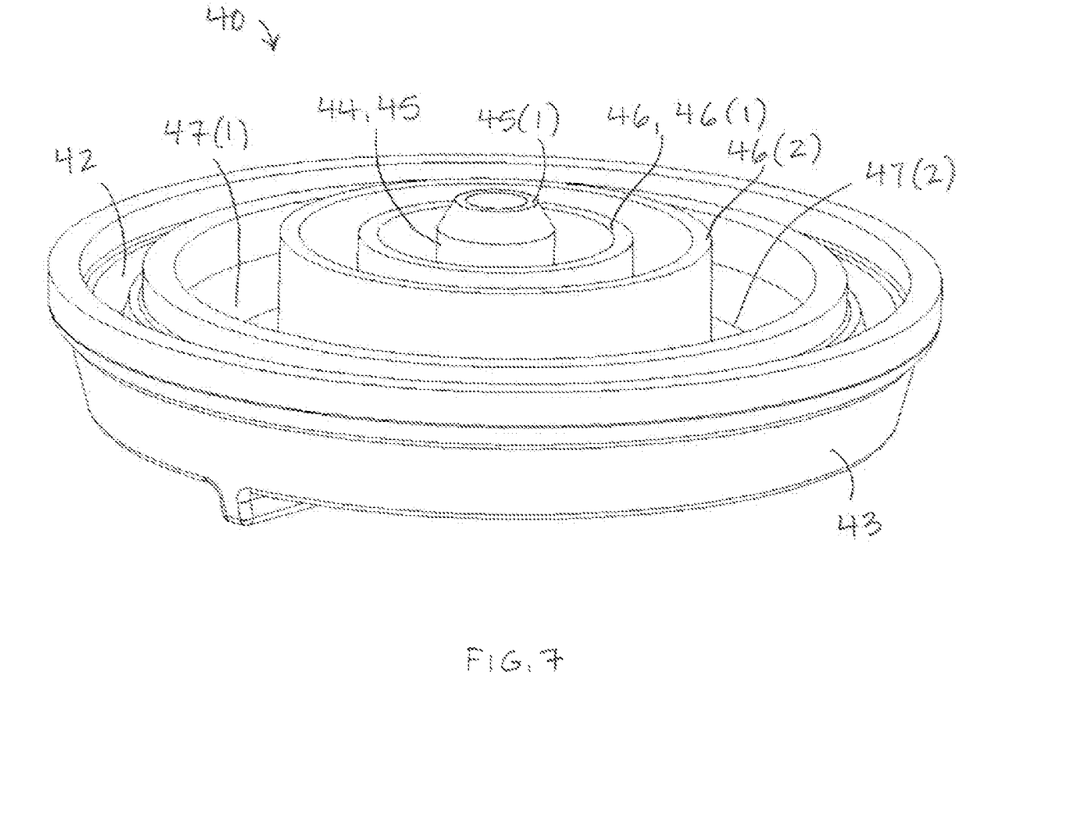
FIG. 7 is a top perspective view of the lid of the valve body.

Referring to FIGS. 4 and 7, the valve body 20 includes a lid 40 that closes the open second end 23 of the valve body sidewall 21. For example, an inner surface 41 of the lid 40 may include an annular groove 42 that extends along, and is closely adjacent to, the lid peripheral edge 43. The groove 42 may receive the sidewall second end 23 in a press fit engagement. In some embodiments, a lid seal (not shown) may be disposed in the groove 42 between the sidewall second end 23 and the lid 40 to ensure that the connection between the lid 40 and the sidewall 21 is fluid tight. In other embodiments, a bead of sealing adhesive (not shown) may be may be disposed in the groove 42 between the sidewall second end 23 and the lid 40 to ensure that the connection between the lid 40 and the sidewall 21 is both fluid tight and secure.

The inner surface 41 of the lid 40 faces the valve plug 50 and includes surface features 44 that cooperate with corresponding surface features 64 of the valve plug 50 to provide the bearing 100 by which the valve plug 50 is rotatably supported with respect to the valve body 20. In the illustrated embodiment, the valve body lid 40 surface features 44 are constituted by a pin 45 that protrudes toward the valve plug 50. The pin 45 is a hollow, low profile cylinder that is coaxial with the rotational axis 52 of the plug 50. A terminal end surface 45(1) of the pin 45 may be beveled to facilitate insertion of the pin 45 into a bore 68 defined by the surface features 64 of the valve plug 50. The pin 45 provides the stator portion of the bearing 100.

The lid 40 includes the annular projections 46 that protrude from the lid inner surface 41 toward the valve plug 50. The annular projections 46 include a lid inner ring 46(1) and a lid outer ring 46(2) that encircle the bearing 100 and are concentric with the rotational axis 52. The lid inner and outer rings 46(1), 46(2) have a height dimension that is less than the height dimension of the pin 45. In addition, each of the lid inner and outer rings 46(1), 46(2) are surrounded by an annular well 47(1), 47(2) that is recessed with respect to the lid inner surface 41.

Figures 8, 9:
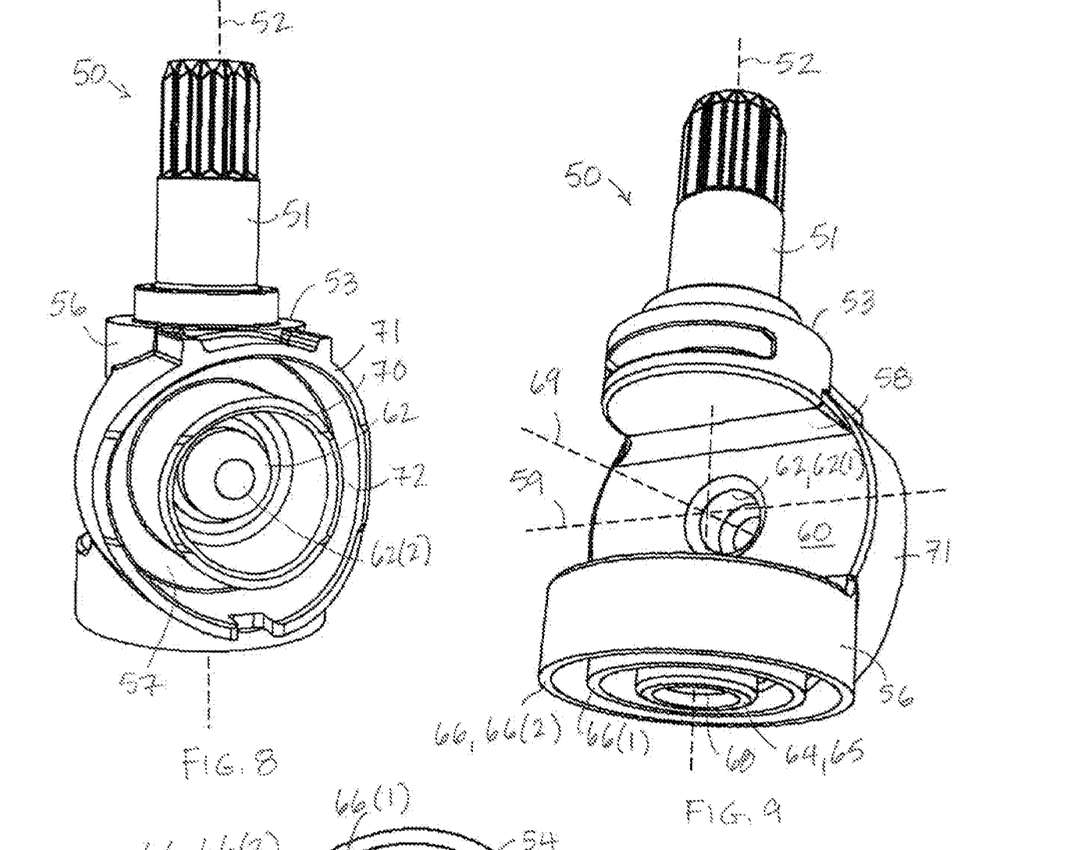
FIG. 8 is a perspective view of the valve plug.
FIG. 9 is another perspective view of the valve plug.
Figure 10:
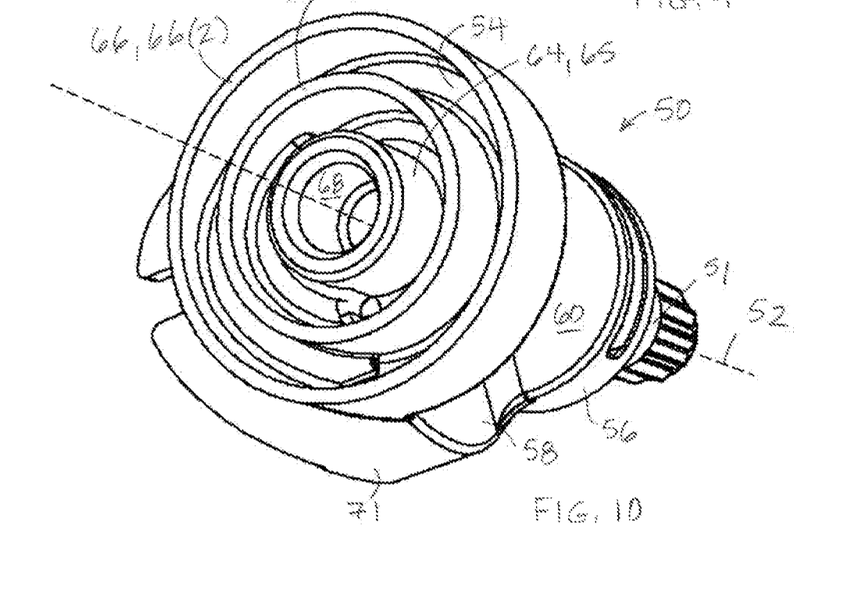
FIG. 10 is yet another perspective view of the valve plug.

Referring to FIGS. 8-10, the valve plug 50 is a generally cylindrical member having a first end 53 that faces the valve body first end 22, and an opposed, second end 54 that faces the lid inner surface 41. The valve plug 50 includes a side surface 56 that faces an inner surface of the valve body sidewall 21.

The valve plug 50 includes the valve shaft 51 that is integral with and protrudes from the valve plug first end 53. A centerline of the valve shaft 51 defines the rotational axis 52 of the valve plug 50. The valve shaft 51 extends through the central opening 26 of the valve body first end 22, and is configured to be connected to the valve actuator 6. For example, in the illustrated embodiment, the outer surface of the valve shaft 51 may include flats, splines (shown) or other features that permit engagement with an output structure of the actuator 6. Upon actuation, the valve shaft 51 and the valve plug 50 rotate relative to the valve body 20 about the rotational axis 52, and the rotational orientation of the valve plug 50 relative to the valve body 20 is set by a controller (not shown) via the actuator 6.

The valve plug 50 includes a linear first groove 58 that extends diametrically through the valve plug 50 in a direction perpendicular to the rotational axis 52. The first groove 58 defines a "U" shape that opens at a circumference of the side surface 56 so that the first groove 58 opens facing the valve body sidewall 21. The first groove 58 is co-axial with a first plug transverse axis 59 that is perpendicular to, and intersects, the rotational axis 52. In some rotational orientations of the valve plug 50 relative to the valve body 20, for example when the first plug transverse axis 59 is parallel to the diameter d1 of the valve body 20, the first groove 58 provides a portion of a fluid passage 60 that extends between the first valve port 33 and the third valve port 35.

A side 57 of the valve plug 50 that is opposed to the first groove 58, referred to here as "the plug opposed side 57," is configured to provide surface features that support and retain a valve seal 110. The plug opposed side 57 includes a centrally-located cylindrical protrusion 62. The protrusion 62 is hollow and thus defines a pocket 62(1) that opens to the first groove 58 and serves as an aid to assembly of the valve. The protrusion 62 is co-axial with a second plug transverse axis 69 that is perpendicular to, and intersects, both the first plug transverse axis 59 and the rotational axis 52. The protrusion 62 extends toward the valve body sidewall 21 and is surrounded by a pair of annular sleeves 70, 71 that are concentric with the second plug transverse axis 69. The terminal end 62(2) of the protrusion 62 is recessed relative to the terminal ends of the sleeves 70, 71. The annular recess 72 defined between the sleeves 70, 71 is configured to receive the valve seal 110. The valve seal 110 is annular, and is shaped and dimensioned to surround a corresponding one of the valve ports 33, 34, 35 when the valve plug 50 is certain orientations with respect to the valve body 20. An annular spring 112 is disposed in the recess 72 so as to be disposed between the valve seal 110 and the valve plug 50. The spring 112 biases the valve seal 110 toward the sidewall 21. In use the valve seal 110 abuts the inner surface of the sidewall 21, preventing fluid passage between the valve plug 50 and the valve body 20.

The second end 54 of the valve plug 50 includes the surface features 64 that cooperate with corresponding surface features 44 of the valve body lid 40 to provide the bearing 100 by which the valve plug 50 is rotatably supported with respect to the valve body 20. In the illustrated embodiment, the surface features 64 of the valve plug 50 are constituted by a centrally located protruding boss 65. The boss 65 is a hollow cylinder that is concentric with the rotational axis 52, and an inner surface of the boss 65 defines a bore 68 that is configured to receive the pin 45 in a sliding fit. The bore 68 serves as bearing surface of the bearing 100, on which the journal (e.g., the pin 45) is supported for rotation.

In addition, the second end 54 of the valve plug 50 includes the annular projections 66 that protrude from the plug second end 54 toward the lid 40. The annular projections 66 include a plug inner ring 66(1) and a plug outer ring 66(2) that encircle the bearing 100 (e.g., the boss 65 and the pin 45), and are concentric with the rotational axis 52. The plug inner and outer rings 66(1), 66(2) have a height dimension that is less than the height dimension of the boss 65. In addition, each of the plug inner and outer rings 66(1), 66(2) surround an annular well 67(1), 67(2). In the illustrated embodiment, the inner well 67(1) is disposed between the plug inner ring 66(1) and the boss 65, and is recessed with respect to the bore blind end 68(1). The outer well 67(2) is disposed between the plug inner and outer rings 66(1), 66(2), and the outer well 67(2) is recessed with respect to the bore blind end 68(1).

Figure 11:
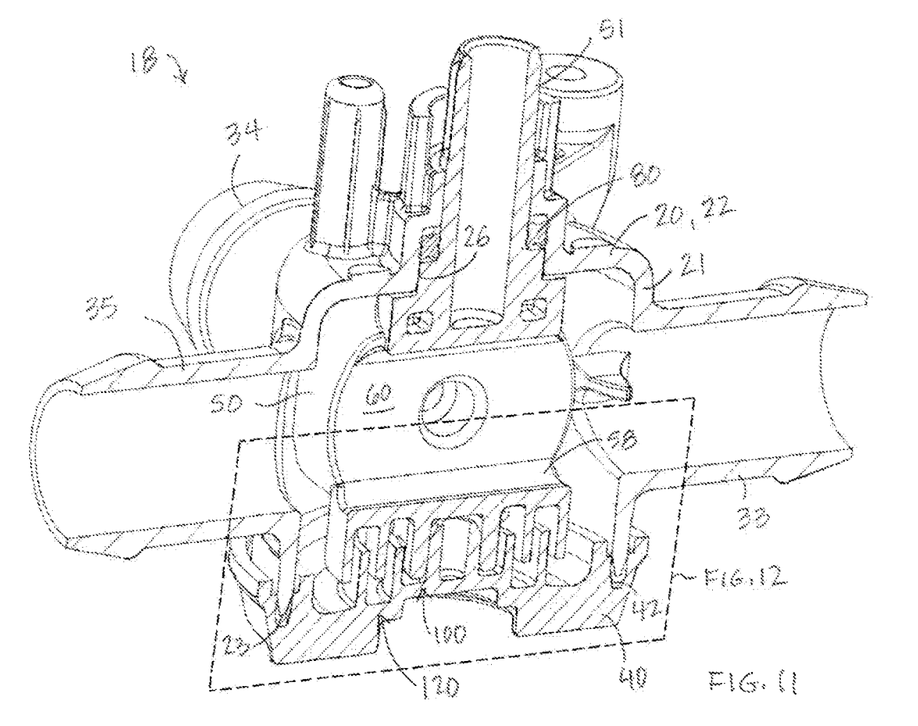
FIG. 11 is a cross-sectional view of the rotary plug valve as seen along line 11-Il of FIG. 2.
Figure 12:
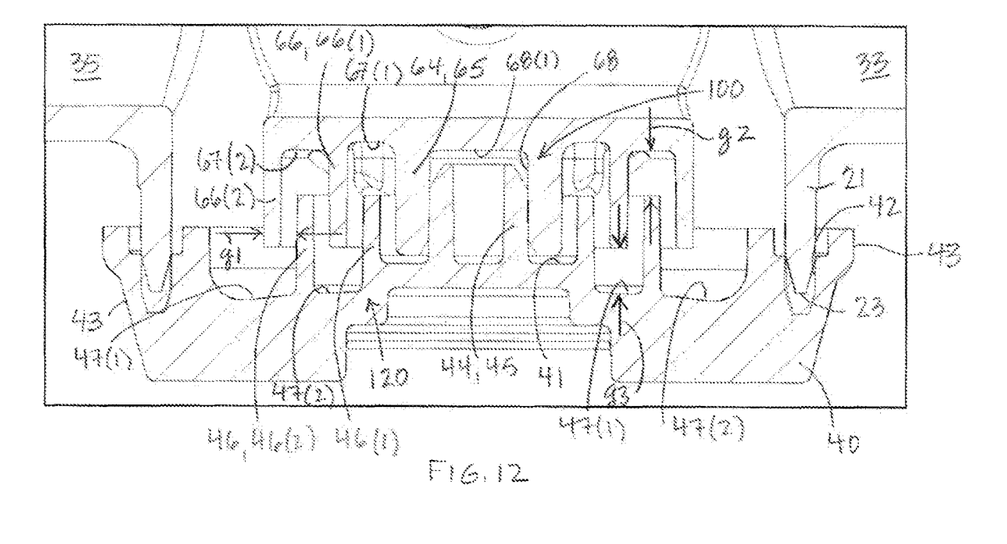
FIG. 12 is an enlarged view of a portion of FIG. 11.

Referring to FIGS. 11-12, in the assembled rotary plug valve 18, the pin 45 of the lid 40 is disposed in the bore 68 of the valve plug 50 so as to provide the plain bearing 100 that supports the valve plug 50 for rotation within the valve body 20. In the illustrated embodiment, the valve plug 50 and the lid 40 are configured so that, during assembly of the lid 40 with the body sidewall 21, the pin 45 engages the bore 68 prior to formation of the labyrinth 120. This is achieved, for example, by forming the lid 40 so that the pin 45 protrudes beyond the lid annular projections 46, and so that the boss 65 is recessed relative to the body annular projections 66.

In addition, the lid annular projections 46 are enmeshed with the plug annular projections 66 so as to form the labyrinth 120 that surrounds the bearing 100. In particular, the lid and plug annular projections 46, 66 are configured in such a way that the annular projections 46 of the lid 40 alternate with the annular projections 66 of the valve plug 50 in a radial direction relative to the rotational axis 52, and so that the annular projections 46 of the lid 40 axially overlap the annular projections 66 of the valve plug 50. For example, in the illustrated embodiment, the lid inner annular projection 46(1) encircles, and is radially spaced apart from the bearing 100 (e.g., from the boss 65). The plug inner annular projection 66(1) encircles, and is radially spaced apart from, the lid inner annular projection 46(1). The lid outer annular projection 46(2) encircles, and is radially spaced apart from, the plug inner annular projection 66(1). The plug outer annular projection 66(2) encircles, and is radially spaced apart from, the lid outer annular projection 46(2). In this embodiment, the radial gap g1 between each adjacent pair of annular projections is approximately the same. In addition, the axial gap g2 between the lid annular protrusions 46(1), 46(2) and the valve plug second end 54 is greater than the radial gap g1. Similarly, the axial gap g3 between the plug annular protrusions 66(1), 66(2) and the lid inner surface is greater than the radial gap g1. This configuration has the effect of accelerating the fluid flow through the radial gaps g1, which are relatively narrow as compared to the axial gaps g2, g3, and decelerating the fluid flow within the relatively wide axial gaps g2, g3 corresponding to the wells 47, 67. The changes in fluid speed and direction within the labyrinth 120 reduces fluid flow to the bearing 100 and results in the particles being trapped within the wells 47, 67, particularly in the wells that are located at lowest points of the labyrinth fluid path. For example, in the valve orientation shown in FIGS. 11 and 12, the lid wells 47(1), 47(2) are located at the lowest points of the labyrinth fluid path. Thus, the labyrinth 120 provides a fluid path in which abrasive media suspended in the fluid is hindered or prevented from reaching the bearing 100, reducing wear and increasing the operating life of the rotary plug valve 18.

Figure 13:
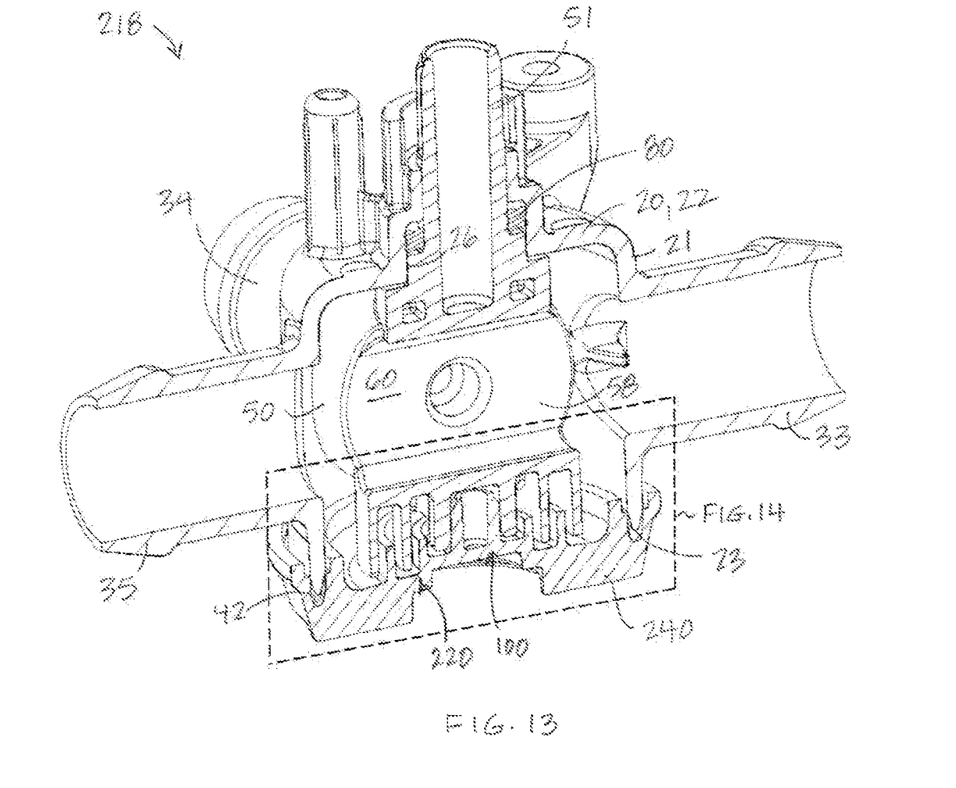
FIG. 13 is a cross-sectional view of another embodiment the rotary plug valve.
Figure 14:
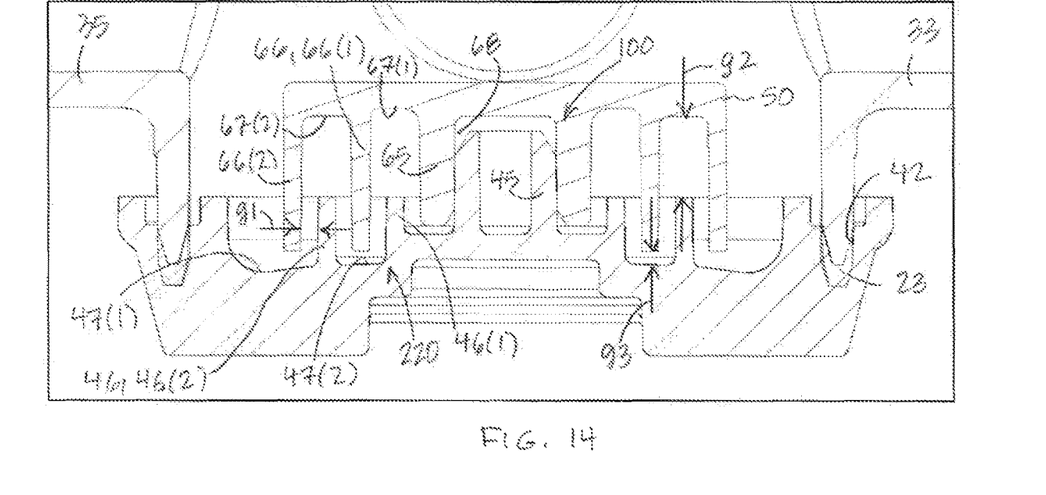
FIG. 14 is an enlarged view of a portion of FIG. 13.

Referring to FIGS. 13 and 14, an alternative embodiment rotary plug valve 218 is similar to the rotary plug valve 18 described above with respect to FIGS. 1-13, and common references numbers are used to refer to common elements. However, in the rotary plug valve 218 of FIG. 14, the spacing of the elements of the labyrinth 220 is different than the spacing of the labyrinth 120 described above. In particular, in the rotary plug valve 218, the radial gaps g1 are as described in the previous embodiment. However, in the rotary plug valve 218, the axial gap g2 between the lid annular protrusions 46(1), 46(2) and the valve plug second end 54 is approximately the same as the radial gap g1, whereas the axial gap g3 between the plug annular protrusions 66(1). 66(2) and the lid inner surface is greater than the radial gap g1 and the axial gap g2.

Figure 15:
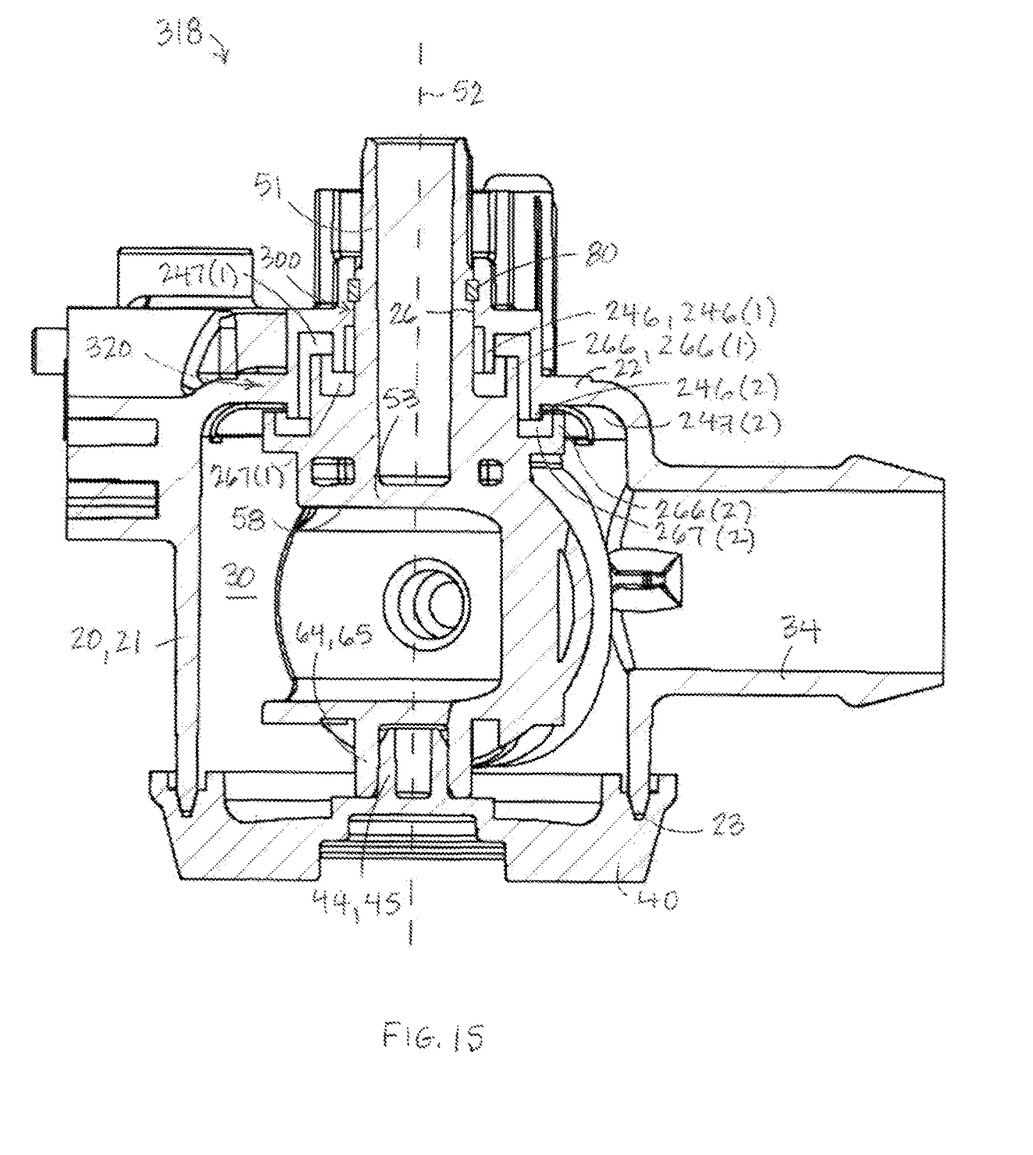
FIG. 15 is a cross-sectional view of an alternative embodiment rotary plug illustrating a labyrinth surrounding the bearing surfaces of the valve shaft.

Referring to FIG. 15, an alternative embodiment rotary plug valve 318 is similar to the rotary plug valve 18 described above with respect to FIGS. 1-13, and common references numbers are used to refer to common elements. However, in the rotary plug valve 318 of FIG. 15, the labyrinth 120 surrounding the bearing 100 is omitted. In addition, a labyrinth 320 is included that surrounds and protects the plain valve shaft bearing 300 defined between the valve shaft 51 and the valve body central opening 26. In particular, each of the valve body 20 and the valve plug 50 include annular projections 246, 266 that form a labyrinth 320 that surrounds the bearing 300 of the valve shaft 51. The annular projections 246, 266 encircle the valve shaft bearing 300 and axially overlap one another so as to form a labyrinth flow path that attenuates flow of fluid disposed in the valve body 20 to the valve shaft bearing 300, and entraps abrasive media suspended in the fluid. The labyrinth 320 is disposed between the shaft seal 80 and the valve body first end 53.

The valve body closed first end 22 includes the annular projections 246 that protrude from the first end inner surface toward the valve plug 50. The annular projections 246 include a first end inner ring 246(1) and a first end outer ring 246(2) that encircle the valve shaft bearing 300 and are concentric with the rotational axis 52. Each of the first end inner and outer rings 246(1), 246(2) are surrounded by an annular well 247(1), 247(2).

In addition, the first end 53 of the valve plug 50 includes the annular projections 266 that protrude from the plug first end 53 toward the valve body closed first end 22. The annular projections 266 include a plug inner ring 266(1) and a plug outer ring 266(2) that encircle the bearing 300, and are concentric with the rotational axis 52. In addition, each of the plug inner and outer rings 266(1), 266(2) surround an annular well 267(1), 267(2). In the illustrated embodiment, the inner well 267(1) is disposed between the plug inner ring 266(1) and the valve shaft 51. The outer well 267(2) is disposed between the plug inner and outer rings 266(1), 266(2).

In this embodiment, the first end inner annular projection 246(1) encircles, and is radially spaced apart from the valve shaft 51 in the close vicinity of the valve shaft bearing 300. The plug inner annular projection 266(1) encircles, and is radially spaced apart from, the first end inner annular projection 246(1). The first end outer annular projection 246(2) encircles, and is radially spaced apart from, the plug inner annular projection 266(1). The plug outer annular projection 266(2) encircles, and is radially spaced apart from, the first end outer annular projection 246(2). In this embodiment, the radial gap g1 between each adjacent pair of annular projections is approximately the same. In addition, the axial gap g2 between the first end annular protrusions 246(1), 246(2) and the valve plug first end 53 is greater than the radial gap g1. Similarly, the axial gap g3 between the plug annular protrusions 266(1), 266(2) and the first end inner surface is greater than the radial gap g1. This configuration has the effect of accelerating the fluid flow through the radial gaps g1, which are relatively narrow as compared to the axial gaps g2, g3, and decelerating the fluid flow within the relatively wide axial gaps g2, g3 corresponding to the wells 247, 267. The changes in fluid speed and direction within the labyrinth 320 reduces fluid flow to the valve shaft bearing 300 and results in the particles being trapped within the wells 247, 267, particularly in the wells that are located at lowest points of the labyrinth fluid path. Thus, the labyrinth 320 provides a fluid path in which abrasive media suspended in the fluid is hindered or prevented from reaching the valve shaft bearing 300 and seal 80, reducing wear and increasing the operating life of the rotary plug valve 318.

In some embodiments, the rotary plug valve may include both the labyrinth 120 that surrounds the bearing 100 and the labyrinth 320 that surrounds the valve shaft 51.

In the illustrated embodiment, the lid 40 closes the open second end 23 of the valve body 20. However, the rotary plug valve 18 is not limited to this configuration. For example, in other embodiments, the open end 23 of the valve body 20 may be closed by a housing (not shown) of the actuator or other ancillary structure. In this case, the structure that closes the valve body open second end 23 would include the corresponding surface features 44 and annular projections 46.

In the illustrated embodiment, the bearing 100 is constituted by the pin 45 that protrudes from the lid inner surface and the bore 68 that is provided on the lid-facing surface of the valve plug 50. The bearing 100 is not limited to this configuration. For example, in some embodiments, the bore 68 may be provided on the lid inner surface and the pin 45 may protrude from the lid-facing surface of the valve plug 50.

In the illustrated embodiment, the rotary plug valve 18 includes a single bearing 100. The rotary plug valve 18 is not limited to this configuration. For example, in some embodiments, the rotary plug valve 18 may include a bearing on each of opposed sides of the valve plug 50.

Selective illustrative embodiments of the fluid delivery system including the rotary plug valve are described above in some detail. It should be understood that only structures considered necessary for clarifying the fluid delivery system and the rotary plug valve have been described herein. Other conventional structures, and those of ancillary and auxiliary components of the fluid delivery system and the rotary plug valve, are assumed to be known and understood by those skilled in the art. Moreover, while a working example of the fluid delivery system and the rotary plug valve have been described above, the fluid delivery system and the rotary plug valve are not limited to the working example described above, but various design alterations may be carried out without departing from the fluid delivery system and/or the rotary plug valve as set forth in the claims.

We claim:

1. A rotary valve comprising a valve plug that disposed in a valve body and that is rotatable with respect to the valve body about a rotational axis, wherein surface features of the valve plug and surface features of the valve body cooperate to provide a plain bearing by which the valve plug is rotatably supported with respect to the valve body, and each of the valve plug and the valve body include a plurality of annular projections that encircle the plain bearing and axially overlap one another so as to form a labyrinth that surrounds the plain bearing.

2. The rotary valve of claim 1, wherein the valve plug includes a valve shaft that is aligned with the rotational axis, the valve shaft and the surface features of the valve plug being disposed on opposed sides of the valve plug.

3. The rotary valve of claim 1, wherein
the surface features of the valve plug include one of
a pin that is centered on the rotational axis, or
a bore that is centered on the rotational axis, and
the surface features of the valve body include the other of
the pin that is centered on the rotational axis, or
the bore that is centered on the rotational axis, and
the pin is disposed in, and supported for rotation by, the bore so as to provide the plain bearing.

4. The rotary valve of claim 1, wherein
the surface features of the valve plug include one of
a shaft that is centered on the rotational axis, or
an opening that is centered on the rotational axis, and
the surface features of the valve body include the other of
the shaft that is centered on the rotational axis, or
the opening that is centered on the rotational axis, and
the shaft is disposed in, and supported for rotation by, the opening so as to provide the plain bearing.

5. The rotary valve of claim 1, wherein the labyrinth flow path is defined between
a body annular protrusion that protrudes from an inner surface of the valve body and encircles the plain bearing; and
a plug annular protrusion that protrudes from an outer surface of the valve plug, encircles the plain bearing, and is radially spaced apart from the body annular protrusion.

6. The rotary valve of claim 5, wherein the radial spacing between the body annular protrusion and the plug annular protrusion is less than an axial spacing between the body annular protrusion and the valve plug.

7. The rotary valve of claim 6, wherein the radial spacing between the body annular protrusion and the plug annular protrusion is less than an axial spacing between the plug annular protrusion and the valve body.

8. The rotary valve of claim 5, wherein
the body annular protrusion includes
a first body annular protrusion, and
a second body annular protrusion that surrounds the first body annular protrusion,
the plug annular protrusion includes
a first plug annular protrusion that is disposed between, and radially spaced apart from, the first body annular protrusion and the second body annular protrusion, and
a second plug annular protrusion that surrounds, and is radially spaced apart from, the second body annular protrusion.

9. The rotary valve of claim 8, wherein the radial spacing between the first body annular protrusion or the second body annular protrusion and an adjacent one of the first plug annular protrusion and the second plug annular protrusion is less than an axial spacing between the first and second body annular protrusions and the valve plug.

10. The rotary valve of claim 8, wherein the radial spacing between the first body annular protrusion or the second body annular protrusion and an adjacent one of the first plug annular protrusion and the second plug annular protrusion is less than an axial spacing between the first and second plug annular protrusions and the valve body.

11. A rotary valve comprising:
a valve body that includes
a body sidewall that encircles and is centered on a body axis,
a body first end that closes one end of the body sidewall,
a body second end that is opposite the body first end, the body second end being open,
a lid that closes the body second end, the body sidewall, the body first end and the lid cooperating to define a valve body chamber and
valve ports, each valve port communicating with the valve body chamber:
a valve plug that is disposed in the valve body chamber, the valve plug being rotatable relative to the valve body about a rotational axis that coincides with the body axis, the valve plug configured to provide a fluid path between certain ones of the valve ports for a predetermined rotational orientation of the valve plug with respect to the valve body; and
a labyrinth that provides a labyrinth flow path between the valve plug and the lid,
wherein
the lid comprises a lid surface feature that includes one of
a pin that is centered on the rotational axis, or
a bore that is centered on the rotational axis,
the lid surface feature is engaged with a plug surface feature provided on the valve plug, the plug surface feature including the other of
the pin that is centered on the rotational axis, or
the bore that is centered on the rotational axis,
the pin is disposed in the bore to provide a plain bearing that supports the valve plug for rotation relative to the valve body,
the labyrinth encircles the plain bearing, and
the valve plug includes a valve shaft that is coaxial with the plug surface feature, the valve shaft and the plug surface feature being disposed on opposed sides of the valve plug.

12. The rotary valve of claim 11, wherein
a lid inner surface faces the valve plug,
the lid surface feature is the pin that protrudes from the lid inner surface so as to be centered on the rotational axis, and
the bore is provided on the valve plug, the pin and the bore cooperating to provide the plain bearing.

13. The rotary valve of claim 11, wherein the valve plug includes a passageway that provides a fluid path between certain ones of the valve ports for a predetermined rotational orientation of the valve plug with respect to the valve body.

14. The rotary valve of claim 11, wherein the labyrinth comprises:
a lid annular protrusion that protrudes from an inner surface of the lid and encircles the plain bearing; and
a plug annular protrusion that protrudes from an outer surface of the valve plug, encircles the plain bearing, and is radially spaced apart from the lid annular protrusion,
the plug annular protrusion and the lid annular protrusion being arranged to form the labyrinth flow path.

15. The rotary valve of claim 14, wherein a radial spacing between the lid annular protrusion and the plug annular protrusion is less than an axial spacing between the lid annular protrusion and the valve plug.

16. The rotary valve of claim 15, wherein the radial spacing between the lid annular protrusion and the plug annular protrusion is less than an axial spacing between the plug annular protrusion and the lid.

17. The rotary valve of claim 14, wherein
the lid annular protrusion includes
a first lid annular protrusion, and
a second lid annular protrusion that surrounds the first lid annular protrusion,
the plug annular protrusion includes
a first plug annular protrusion that is disposed between, and radially spaced apart from, the first lid annular protrusion and the second lid annular protrusion, and
a second plug annular protrusion that surrounds, and is radially spaced apart from, the second lid annular protrusion.

18. The rotary valve of claim 17, wherein a radial spacing between the first lid annular protrusion or the second lid annular protrusion and an adjacent one of the first plug annular protrusion and the second plug annular protrusion is less than an axial spacing between the first and second lid annular protrusions and the valve plug.

19. The rotary valve of claim 17, wherein a radial spacing between the first lid annular protrusion or the second lid annular protrusion and an adjacent one of the first plug annular protrusion and the second plug annular protrusion is less than an axial spacing between the first and second plug annular protrusions and the lid.

* * * * *